United States Patent [19]
Chriske et al.

[11] Patent Number: 4,838,178
[45] Date of Patent: Jun. 13, 1989

[54] HAZARDOUS MATERIAL SHIPPING PALLET

[75] Inventors: Eugene Chriske, El Paso, Tex.; Theodore Leno, Jr., Gilroy; Alva L. Fudge, San Martin, both of Calif.

[73] Assignee: Haz Pal, Inc., El Paso, Tex.

[21] Appl. No.: 201,603

[22] Filed: Jun. 2, 1988

[51] Int. Cl.⁴ .............................................. B32B 9/00
[52] U.S. Cl. .................................. 108/55.1; 108/51.1
[58] Field of Search ..................... 108/55.1, 51.1, 24

[56] References Cited

U.S. PATENT DOCUMENTS

| | | |
|---|---|---|
| Re. 32,344 | 2/1987 | Wind . |
| 2,619,917 | 12/1952 | McKee et al. .................. 108/51.1 X |
| 3,592,145 | 7/1971 | Petry .................................. 108/51.1 |
| 4,000,704 | 1/1977 | Griffin, Jr. . |
| 4,007,694 | 2/1977 | Fowler et al. ...................... 108/55.1 |
| 4,029,023 | 6/1977 | Rosewicz et al. .................. 108/51.1 |
| 4,220,100 | 9/1980 | Palomo et al. ...................... 108/51.1 |
| 4,407,878 | 10/1983 | Smith et al. ...................... 108/51.1 X |

*Primary Examiner*—Peter A. Aschenbrenner
*Attorney, Agent, or Firm*—Blakely, Sokoloff, Taylor & Zafman

[57] ABSTRACT

A reusable portable platform which can serve as a shipping pallet and as secondary containment for 55-gallon drums during transit or storage. The containment is fabricated to withstand the corrosiveness of hazardous materials. The upper surface is removable to allow inspection and cleaning of the container's interior. The footed portion provides support and allows the empty platforms to be stacked and moved via a fork-lift.

18 Claims, 4 Drawing Sheets

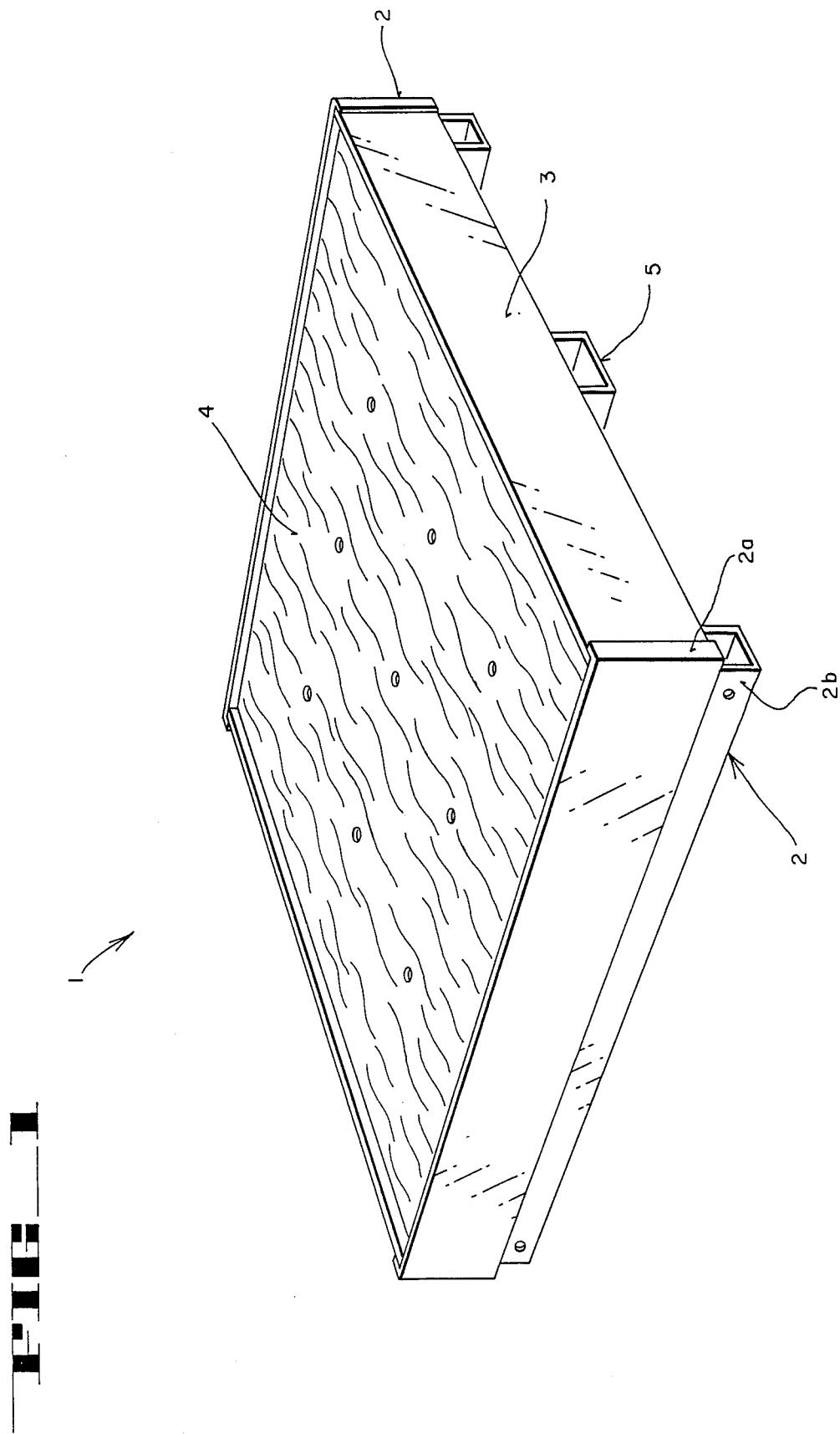

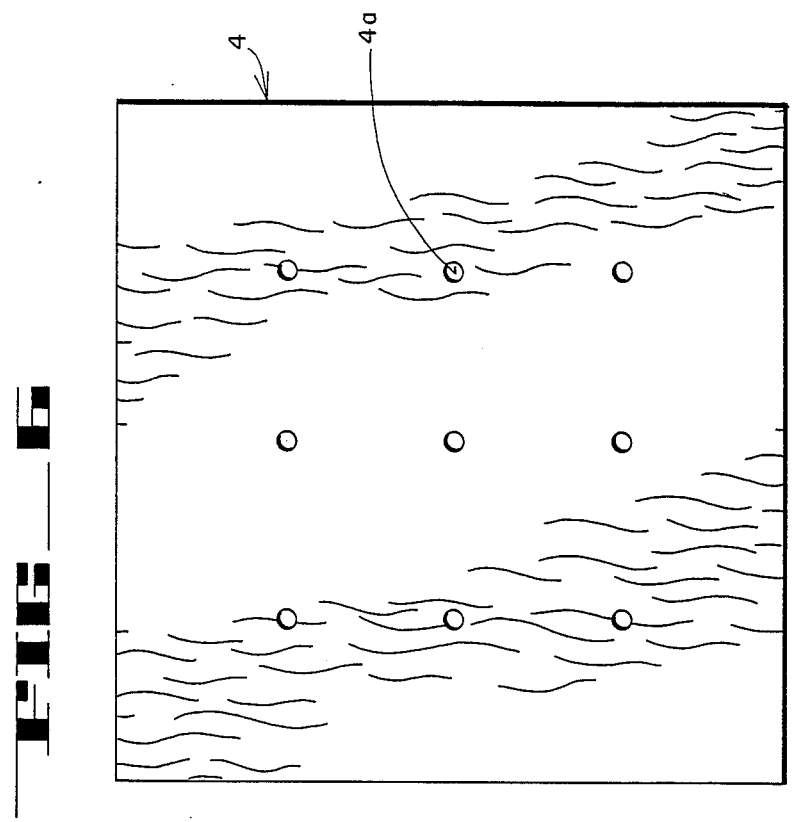
FIG_5
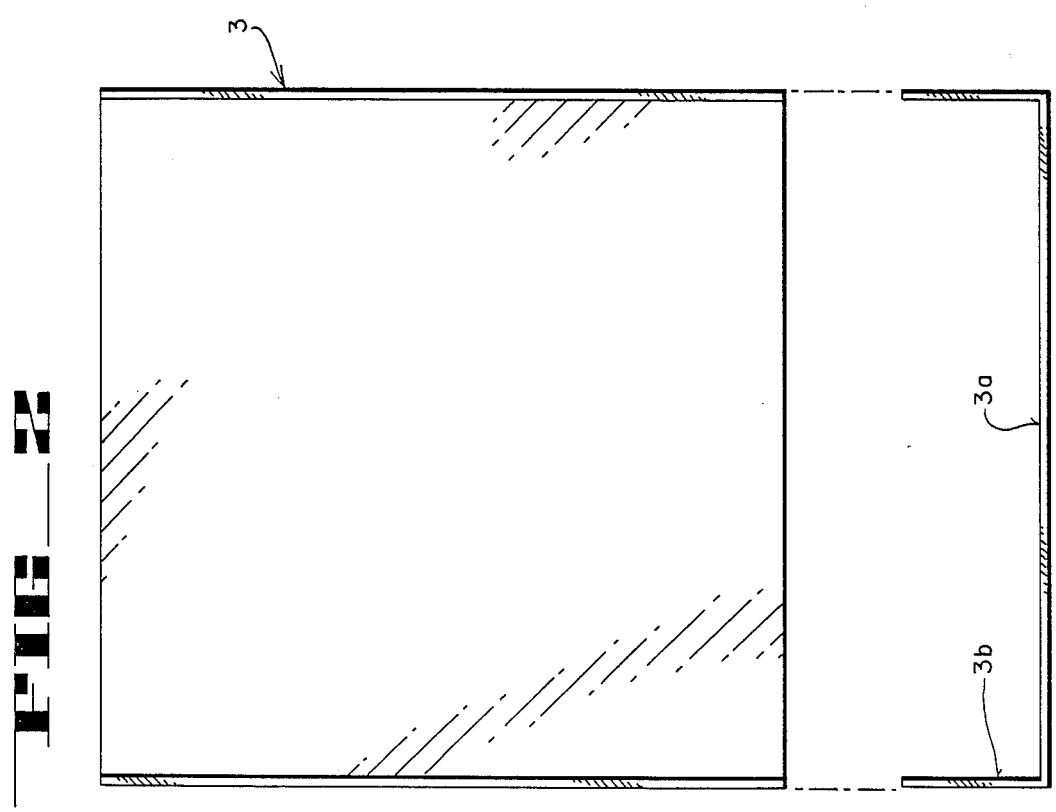
FIG_2

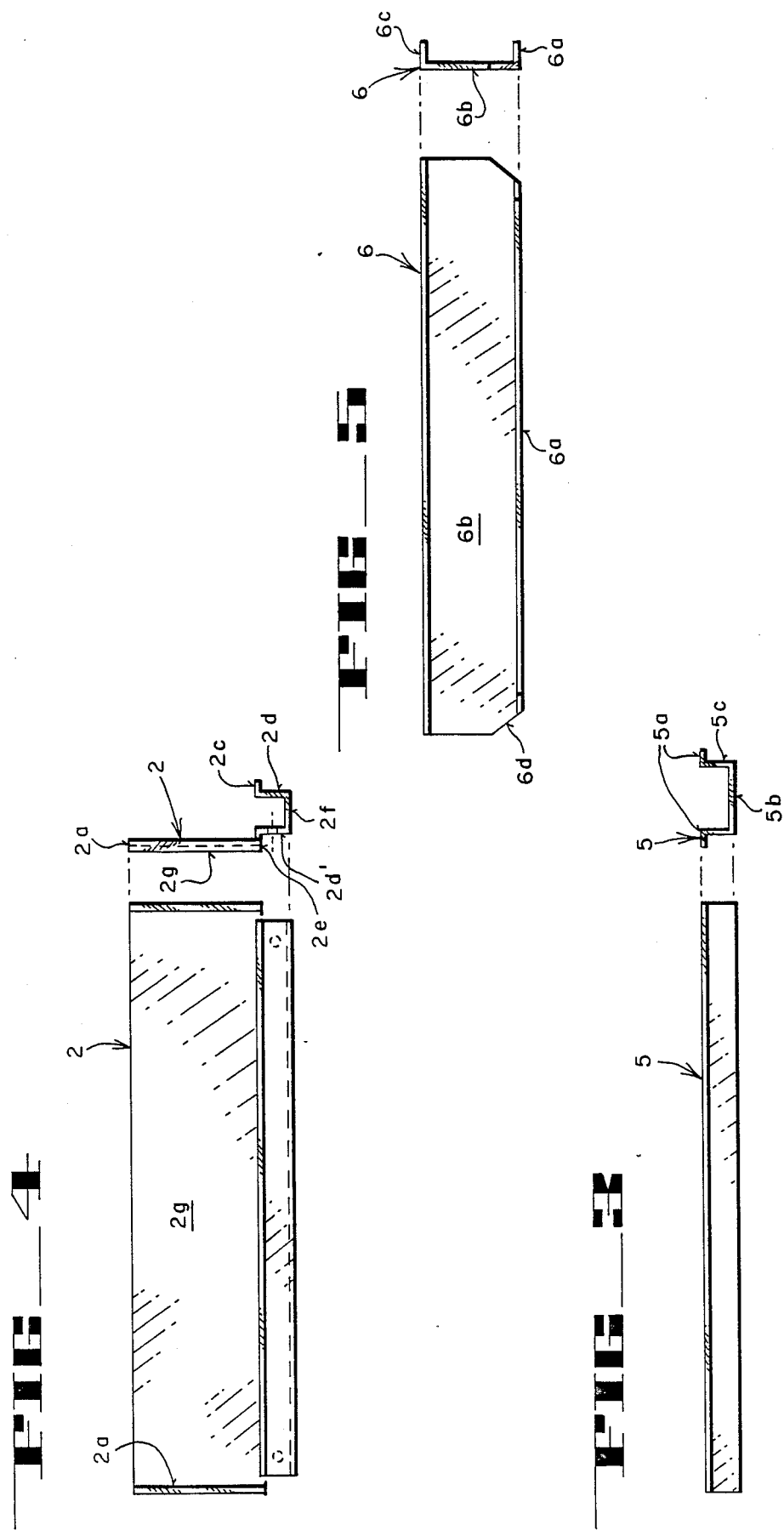

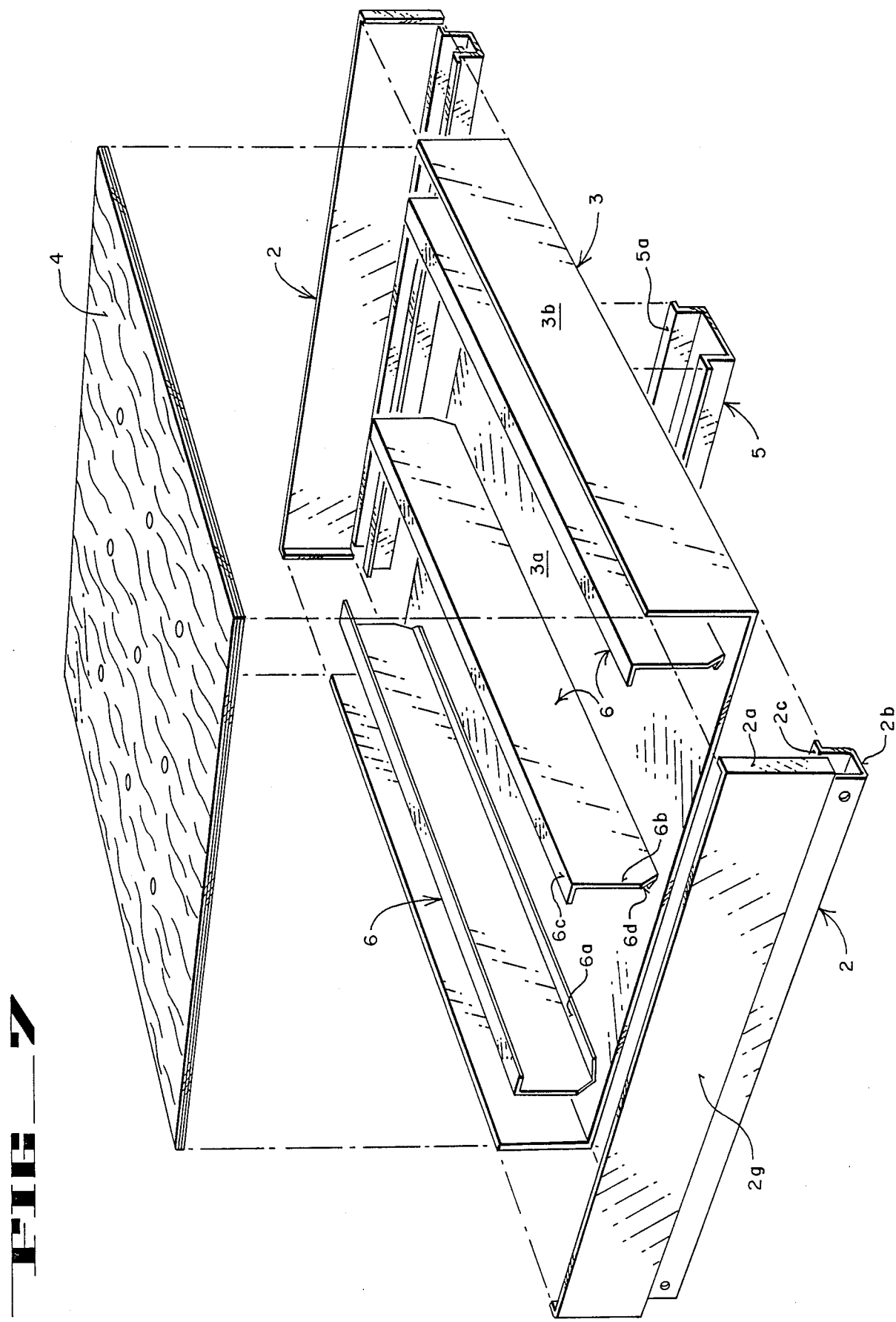

HAZARDOUS MATERIAL SHIPPING PALLET

BACKGROUND OF THE PRESENT INVENTION

1. Field of Invention.

This invention relates to a shipping pallet made of metallic material and which in addition to providing a flat surface for large drum containers, provides a secondary containment for hazardous materials that may leak from the large primary containers.

2. Prior art.

The most common shipping pallets are made of wood but wooden pallets suffer from many faults, not the least of is the fact that wooden pallets have a limited lifetime, lasting for only two or three trips, and additionally suffer from weather degradation and do not function as a secondary container.

Various designs and construction types for shipping pallets have been patented. For example, Griffin U.S. Pat. No. 4,000,704 fabricated a nestable molded pallet and container providing interlocking and stacking capabilities. Wind U.S. Pat. No. Re. 32,344 provides for a shipping pallet formed from a unitary sheet of formable material and which allows the user to form a shipping container by attaching a protective sleeving and restraining with a plurality of strapping bands. However, despite a number of prior art designs for pallets functioning as a container, the problem of secondary containment of hazardous materials has not been addressed. Further, The Department of Transportation merely requires that the "shipping containers shall not leak" and "shall be tied down." Since the primary containers presumably do not leak and the containers can be tied to the wooden pallets, hazardous materials containers continue to be shipped on prior art wooden pallets despite their limited lifetime and lack of any secondary containment.

A prior art wooden pallet is substantially square and has an open lattice like flat surface. The wooden pallets are not designed to provide a secondary containment against hazardous material spillage. For example, if a standard 55-gallon drum leaks, the spilled material flows through the upper surface of the pallet, through to the supporting surface which may be the ground surface or the inside of a transport carrier. If the hazardous material seeps into the ground surface, the risk of environmental damages increases. It is well settled that once hazardous material seeps beyond the surface and into the aquifer layer, costly and lengthy reclamation of the contaminated ground is mandated. This problem of hazardous material leakage and clean-up can be further hampered by a delayed discovery of the leakage. When a pallet of 55-gallon drums is transported in a transit carrier such as a tractor-trailer, a leakage of hazardous material may be hidden until the drums are removed from the carrier and delivered to their destination. While hazardous material spillage within the transit carrier requires costly safety and clean-up measures, the problems resulting from the spillage leaking beyond the transit carrier and into the environment escalate the problems.

Many times, the problems of hazardous material transport is amplified by man made conditions. For example, transit drums (55-gallon containers) are loaded into a transit carrier and placed on a railroad car or even directly loaded into the railroad car. Once the railroad cars are loaded, they may be sidetracked enroute to their final destination. These uncooled and unventilated containers may remain in switching yards or sidetracks for weeks at a time. Elevated temperatures may contribute to a rupture in the manufacturers containers, thus allowing hazardous materials to seep out of the container car and then into the ground surface.

If the leakage occurs in a cross country transit the problem is also enhanced, as the carrier travels from departure point to destination the hazardous material leakage may be continually contaminating the ground surface. Therefore, rather than dealing with a localized spill, clean up is now a long distance process. From all aspects, clean up is costly, both in environmental effects as well as monetary effects, and is time consuming. Liability for hazardous spills and clean up can be attributed to the shipper, the drum manufacturer, the chemical manufacturer, etc., thus enhancing liability in addition to damaging the environmental surroundings.

Accordingly, effort has been directed to designing a reusable shipping pallet which functions as a stable shipping or storage platform and provides effective secondary containment.

SUMMARY OF THE PRESENT INVENTION

An improved shipping pallet is described for use in shipping and storing hazardous materials. The invention is comprised of a secondary container, internal load bearing rails and a removable platform. The container is fabricated to be leak proof and essentially impervious to hazardous materials. The load bearing rails positioned perpendicular to external support members and covered with a removable platform provide adequate support for four (4) 55-gallon primary containers. The platform is typically constructed of a nonskid surface.

BRIEF DESCRIPTION OF THE DRAWINGS

FIG. 1 is a perspective view of the shipping pallet and secondary container.

FIG. 2 shows a top view and an end view of the side wall and base member of the shipping pallet and secondary container of FIG. 1.

FIG. 3 shows a top view of the upper platform of the shipping pallet and secondary container of FIG. 1.

FIG. 4 shows a top view, end view and inside face view of the footed support and side wall member of the shipping pallet and secondary container of FIG. 1.

FIG. 5 shows a side view and an end view of the center support member of the shipping pallet and secondary container of FIG. 1.

FIG. 6 shows an inside view and an end view of a container load bearing rail of the shipping pallet and secondary container of FIG. 1.

FIG. 7 shows an exploded view and the relational positions of the components in the shipping pallet and secondary container of FIG. 1.

DETAILED DESCRIPTION OF THE PRESENT INVENTION

A reusable portable platform functioning as a shipping pallet and providing secondary containment for 55-gallon drums during transit is described. In the following description, numerous specific details are set forth such as specific shapes, materials, dimensions, etc. in order to provide a thorough understanding of the present invention. It will be obvious, however, to one skilled in the art that the present invention may be practiced without these specific details. In other instances well known techniques have not been described in detail in order to not to unnecessarily obscure the present invention.

In FIG. 1 an assembled shipping pallet 1 ("pallet") is described. The pallet 1 is comprised of a combination side wall and base member ("base") 3, a footed end support and side wall member ("end support") 2, a center support member 5 and a removable upper platform 4. The pallet 1 is typically constructed from a variety of metallic materials, however, the preferred embodiment uses carbon steel which is compatible with the majority of hazardous materials. An alternative embodiment is constructed of stainless steel for use with acid, caustic and oxidizing materials. The upper platform 4 in the preferred embodiment is 3/4 inch plywood although the upper platform 4 may be constructed from a variety of non-skid materials.

Referring to FIG. 2 the sidewall and base member ("base") 3 is described. The base member 3 is formed of a unitary sheet of material having a generally planar container base 3a with a pair of side walls 3b bent to 90° typical and extending upwardly from the container base 3a.

The container base 3a is approximately 47 inches by 48 inches with a 90° typical bend forming a 10 inch high by 48 inch long side wall 3b.

Referring to FIG. 3, the center support member 5 is described. The center support member 5 is formed of a unitary sheet of material having a generally planar bottom 5b, with a pair of sides 5c bent to a 90° angle typical in extending upwardly from the bottom 5b, thereby forming a narrow channel. The upper most edges of sides 5c are bent 90° typical outwards forming outwardly extending flanges 5a such that flanges 5a are perpendicular sides 5c and parallel to base 5b. The base 5b is approximately 5 inches wide by 46¾ inches long with the sides 5c extending upwardly for approximately 4 inches in and upper-most flanges 5a extending outwardly for approximately ½ inch.

Referring to FIG. 4, the footed end support and side wall member ("end support") 2 is described. The end support 2 is formed of a unitary sheet of material having a generally planar side wall 2g with an alignment lip 2a inwardly bent to a 90° typical from the height-wise edges of the side wall 2g. Approximately 10 inches from the upper-most edge of the side wall 2g the footed end support 2b is formed with a side wall/support connection 2e formed by an inwardly 90° typical bend, followed at approximately ⅜ inches with a downwardly 90° typical bend, thus forming the outside support wall 2d. In inwardly 90° typical bend followed by an upwardly 90° typical bend forms the support base 2f and the inside support wall 2d'. The upper-most edge of the inside support wall 2d' is outwardly bent 90° typical forming an outwardly extending flange 2c such that flange 2c is planarly aligned with side wall/support connection 2e, perpendicular to inside support wall 2d' and parallel to support base 2f.

The side wall 2g is approximately 10 inches high by 47¼ long with the alignment lip 2a extending inwardly for ⅜ inch. The side wall/support connection 2e is approximately ⅜ inches and the flange 2c is approximately ½ inch. The support walls 2d and 2d' extend downwardly for a approximately 4 inches, thus leaving a 3 inch support base 2f.

Referring to FIG. 5, a container load bearing rail ("rail") 6 is described. The rail 6 is formed of a unitary sheet of material having a generally planar wall 6b with a pair of flanges 6a and 6c bent to a 90° typical extending outwardly from the wall 6b. A triangular notch 6d is removed from the bottom-most edge of wall 6b.

The upper-most edge of the rail 6 is 48 inches long while the bottommost edge is 44 inches with the side wall 6b being 8½ inch high. Both the upper flange 6c and the bottom flange 6a extend outwardly for approximately 1¾ inches. The excluded right angle triangular notch 6d is approximately 2 inches wide by 4 inches high.

Referring to FIG. 6, an upper platform 4 is described. The removable upper platform 4 is substantially square and is provided with a drainage means. In the preferred embodiment, the upper platform 4 is designed with approximately nine (9) one inch circular drainage holes 4a. The drainage holes 4a are positioned at approximately 11½ inches apart and in a substantially square pattern. In the preferred embodiment, due to the non-skid properties of plywood, the upper platform 4 is formed from a unitary sheet of ¾ inch plywood. However, any non-skid surface and provided with an efficient drainage means is within the scope of the present invention.

Referring to FIG. 7, an exploded view of the shipping pallet and secondary container ("pallet") 1 is described. The side wall and base member 3 is formed having two (2) upwardly extending side walls 3b and a generally planar base 3a. On the sides perpendicular to the side walls 3b, two (2) footed end supports and side wall members ("end supports") 2 are positioned. The end supports 2 are positioned with the foot supports 2b extending downward while the side walls 2g extend upward. The bottom surface of the base 3a rests simultaneously on the upper surface of the sidewall/support connector 2e and the upper surface of the flange 2c. The alignment lip 2a extends outward such that the inside surface of the alignment lip 2a rests on the outside surface of the side wall 3b essentially completing a right angle corner. When both end supports 2 are thusly positioned, a substantially square container is formed.

Once the end support 2 are positioned and aligned with the base member 3, the inside seams, i.e. the edgewise surface of the base member 3 where it mates with the inside surface of the side walls 2g, are full-seam welded thus forming a leak-proof container. Where the alignment lip 2e and the outer surface of the side walls 3b join, the seam is stitch welded. Likewise, the upper surface of the foot support 2b is stitch welded to the bottom surface of the container base 3a.

The center support member 5 is centered between the footed end supports 2b. The upper surfaces of the flanges 5a are stitch welded to the bottom surface of the container base 3a. The center support member 5 provides support for the secondary container while allowing the pallet 1 to sit elevated from the ground surface. This elevated position allows accessibility by a forklift, thus enabling the pallet to be relocated, such as from a warehouse to a truck carrier.

Three (3) container load bearing rail 6 are positioned in the container perpendicular to the end and center supports 2b and 5. This allows for an equal distribution of weight over the entire area of the shipping pallet 1. The rails are positioned such that the bottom surface of the flange 6a with the triangular notch 6d rests on the upper surface of the container base 3a. Thus positioned, the rails 6 are stitch welded to the upper surface of the container base 3a.

The removable upper platform 4 is positioned over the rail 6 such that the upper surface of the flange 6c provide a mounting surface for bottom surface of the upper platform 4. The upper platform 4 is held in position by gravity.

Finally, it is to be understood that the above-described structures are only illustrative of the principle of the present invention. In accordance with these principles, numerous modifications and alternatives may be devised by those skilled in the art without departing from the spirit and scope of the present invention.

We claim:

1. A reusable shipping pallet comprising:
   a substantially rectangular leak-proof container comprising:
   (1) a substantially planar base;
   (2) side walls upwardly extending perpendicularly upward;
   a rigid support member fixedly mounted to the bottom surface of said container;
   an internal load bearing rail fixedly mounted to the upper-most surface of the inside of said container;
   a removeable platform
   positioned on said internal load bearing rail.

2. The pallet as recited in claim 1 wherein said platform has a non-skid surface.

3. The pallet as recited in claim 2 wherein said platform is ¾ inch plywood.

4. The pallet as recited in claim 3 wherein three load bearing rails are positioned in said container, perpendicular to said support members.

5. The pallet as recited in claim 4 wherein said container is corrosion resistive.

6. A reusable shipping pallet comprising:
   a substantially planar base unitarily formed with a first pair of upwardly extending side walls;
   a pair of rigid support members unitarily formed with a second pair of upwardly extending side walls;
   a center support member fixedly mounted to the bottommost surface of said planar base;
   a plurality of load bearing rails;
   wherein said second pair of side walls mate with said first pair of side walls forming a substantially rectangular open container such that said container is leakproof;
   removeable platform with a drainage means providing drainage to the inside of said container;
   plurality of said rails are physically mounted to the upper-most surface of said container perpendicular to said support members and said platform is positioned on the uppermost surface of said rails.

7. The pallet as recited in claim 6 wherein said platform has a non-skid surface.

8. The pallet as recited in claim 7 wherein said platform is ¾ inch plywood.

9. The pallet as recited in claim 8 wherein said container is carbon steel.

10. The pallet as recited in claim 9 wherein said container is corrosion resistive.

11. A reusable shipping and storage pallet and secondary container comprising:
    a planar base unitarily formed with a first pair of opposed perpendicular upwardly extending side walls;
    an end support member unitarily formed with an upwardly extending side wall with an inwardly extending alignment lip;
    a center support member parallel to said end support member and fixedly mounted to the bottom-most surface of said planar base;
    a load bearing rail with a pair of outwardly extended flanges;
    a platform with a uniform drainage means;
    whereby a pair of said end supports forming a second pair of side walls are opposingly mated with said planar base and said first pair of side walls such that the inner-most surface of said alignment lip rests on the outer-most surface of said first pair of side walls, thus forming a substantially squared open container;
    and with a plurality of said load bearing rails such that the bottom-most surface of one of the said pair of flanges is fixedly mounted to the upper-most surface of said container;
    and said platform is positioned on the upper-most surface of the other one of said pair of flanges.

12. The pallet as recited in claim 11 wherein the edge-most surface of said planar base with said first pair of side walls is fixedly fastened by a full seam weld to the inner-most surfaces of the second pair of side walls and said end support members, thereby rendering resultant container leak proof.

13. The pallet as recited in claim 12 wherein the remaining seams of said container are fixedly fastened by a stitch weld.

14. The pallet as recited in claim 13 wherein said container is formed from a noncorrosive metallic material selected from the group consisting of carbon steel and stainless steel.

15. The pallet as recited in claim 14 wherein said plurality of said load bearing rails are fixedly mounted within said container perpendicular to said support members.

16. The pallet as recited in claim 15 wherein said platform has a nonskid surface.

17. The pallet as recited in claim 16 wherein said platform is removable.

18. The pallet as recited in claim 17 wherein said platform is ¾ inch plywood.

* * * * *